C. W. GREENE.
BRAILLE SLATE FOR THE BLIND.
APPLICATION FILED JULY 14, 1915.
1,175,951. Patented Mar. 21, 1916.
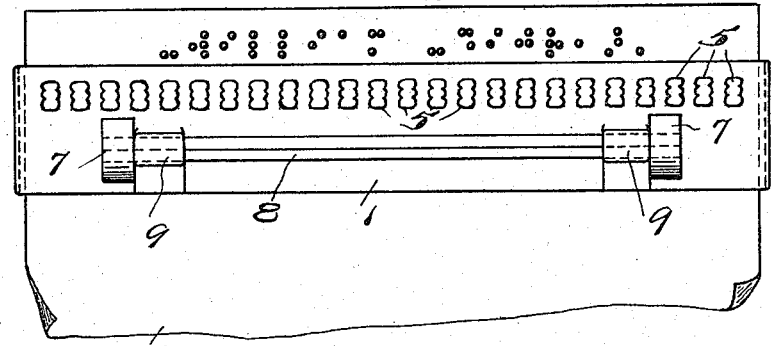
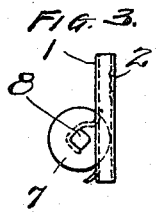
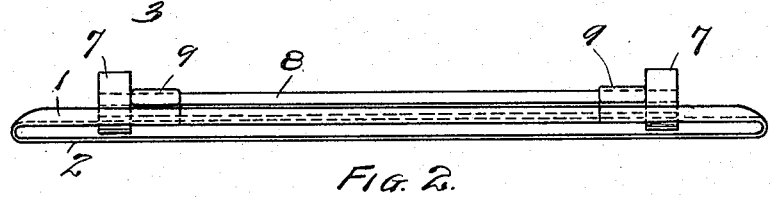
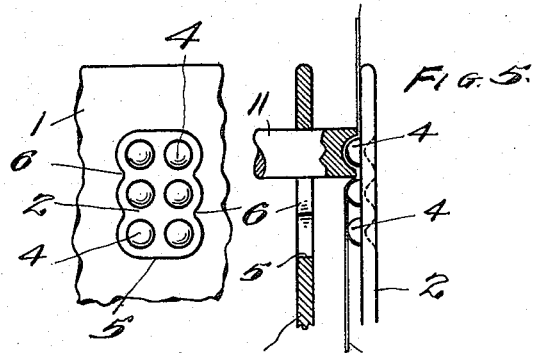
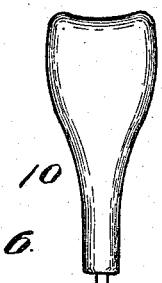
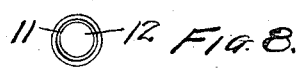
WITNESSES:
Earl Abrams
Wm. W. Dickey
INVENTOR
Chester W. Greene

UNITED STATES PATENT OFFICE.

CHESTER W. GREENE, OF EAST LYNN, MASSACHUSETTS, ASSIGNOR TO COMMONWEALTH ENGINEERING COMPANY, INCORPORATED, OF LYNN, MASSACHUSETTS.

BRAILLE SLATE FOR THE BLIND.

1,175,951.   Specification of Letters Patent.   Patented Mar. 21, 1916.

Application filed July 14, 1915. Serial No. 39,818.

*To all whom it may concern:*

Be it known that I, CHESTER W. GREENE, a citizen of the United States of America, residing at East Lynn, county of Essex, State of Massachusetts, have invented new and useful Improvements in Braille Slates for the Blind, of which the following is a specification.

My present invention relates to an improved Braille slate for the blind.

In the Braille alphabet for the blind the characters and punctuation marks are formed by different arrangements of six points, and the writing is read by passing the fingers over these points. The points, projections, or depressions are made in a sheet of paper of such form as may be used by the blind, and the characters may be either intaglio or relief. In the Braille slates used at the present time, so far as I am aware, the raised points or projections are made by the use of a small round pointed style by which the paper is pressed down and forced into a concave metal groove directly beneath. In this manner the impressions are made backward as the words are written, and after the words have been made, the paper is removed from the slate, and then turned face up so that the raised points can be felt by the finger of the blind reader. Thus it will be evident that the system must be known backward in order to write, and also known forward, in order to read. The present invention eliminates the necessity for learning and using the alphabet backward, and requires the making and reading of the word positively and in the natural, or forward manner.

In the accompanying drawings I have illustrated one complete example of the physical embodiment of my invention, constructed according to the best mode I have so far devised for the practical application of the principles of my invention, and which has proven highly satisfactory in actual use.

Figure 1 is a plan view of the slate made according to my invention illustrating a piece of paper therein. Fig. 2 is an isometric view of the slate. Fig. 3 is an end view of the slate of Fig. 1. Fig. 4 is an enlarged fragmentary view of a portion of the slate showing a serrated guide slot and a group of protuberances or bosses. Fig. 5 is a sectional view of the slate of Fig. 4 showing a stylus applied thereto illustrating its action on the paper. Fig. 6 shows the stylus or style complete. Fig. 7 is a part sectional view of the end of the style to illustrate its concavity. Fig. 8 is an end view of the working face of the style.

The slate is preferably made of two spaced metal plates 1 and 2, joined at their ends, rectangular in form, and spaced apart for the passage of a piece of paper 3. The base plate 2 is imperforate, but a portion of it is provided with protuberant parts or bosses 4, struck up or stamped from the body of the metal plate, and these bosses are arranged in alined groups of six bosses to a group, and the groups are spaced apart and extend across the width of the base plate.

In the top plate 1 and directly above each group of bosses in the base plate, an opening is formed as 5, and it will be seen that the two sides or edges 6 6 of these openings are serrated so that six curved guides or indented edges are provided in the openings in the top plate, one indented edge directly above each boss in the base plate, as best seen in Fig. 4.

In order that the paper may be fed through the slate, I employ a pair of friction wheels 7 7 located on the ends of a rod 8 which is journaled in bearings 9 9 struck up from the metal of the top plate. These wheels protrude through openings in the top or guide plate and frictionally engage the surface of the paper sheet as it is moved through the slate. The sheet of course is moved "step by step" and is guided by the closed ends of the slate, as seen in Fig. 1.

The making or writing of the characters is accomplished by means of a style or tool 10 whose shank or stem 11 has a concave or recessed end or face 12. The bosses on the base plate and the concave recess in the style are hemispherical in form and the concave end of the style is made to conform to and fit neatly over any one of the bosses in the base plate. The shank or stem of the style is of a diameter to fit neatly in any of the rounded corners of the guide grooves or in any one of the central curved or indented edges so that any one of these six curved guide edges may be used in connection with the style.

In forming the characters or writing, the style is passed through the perforation or opening in the guide plate and its concave end pressed over a selected boss or knoblike projection. The paper is thus squeezed or pressed between the style and boss, which together form a female and male die or stamp, and the result on the paper is to form an upwardly projecting protuberance or rounded "point" which may be felt by the fingers of the reader. In Fig. 1 a sample of the record is illustrated on the paper, a portion of which has been moved from the slate, and these points are illustrated as having been made by the style guided in different ones of the curved guide edges of the top perforated plate. A line is illustrated as having been completed and the paper moved out by turning the friction wheels so that a second line is ready for writing. In this manner the record is made and produced with the points projecting upwardly so that they may be read with facility by passing the finger over the points.

What I claim is:—

1. A Braille slate comprising a base plate formed with groups of fixed projecting bosses, and a second plate formed with corresponding openings therethrough having guide edges, and a tool for use in said openings as described.

2. A Braille slate comprising a perforated slate with guide edges and a base plate formed with groups of upwardly projecting bosses beneath said guide edges, and means for passing a paper sheet between said plates.

3. The combination with a base plate having groups of bosses and a top plate having perforations with curved guide edges corresponding to the bosses, of a friction wheel supported on the top plate and projecting through an opening therein for feeding paper between the plates, and a style having a concave end to impress the paper over said bosses.

In testimony whereof I affix my signature.

CHESTER W. GREENE.

Copies of this patent may be obtained for five cents each, by addressing the "Commissioner of Patents, Washington, D. C."